United States Patent
Abou-el-ella et al.

(10) Patent No.: US 10,055,516 B1
(45) Date of Patent: Aug. 21, 2018

(54) TESTING OPEN MOBILE ALLIANCE SERVER PAYLOAD ON AN OPEN MOBILE ALLIANCE CLIENT SIMULATOR

(71) Applicant: Sprint Communications Company L.P., Overland Park, KS (US)

(72) Inventors: Hassan Abou-el-ella, Overland Park, KS (US); Jason M. Farmer, Olathe, KS (US); Muhammad Naeem, Miami, FL (US)

(73) Assignee: Sprint Comunications Company L.P., Overland Park, KS (US)

( * ) Notice: Subject to any disclaimer, the term of this patent is extended or adjusted under 35 U.S.C. 154(b) by 1091 days.

(21) Appl. No.: 14/318,185

(22) Filed: Jun. 27, 2014

(51) Int. Cl.
*G06F 17/50* (2006.01)

(52) U.S. Cl.
CPC .................. *G06F 17/5009* (2013.01)

(58) Field of Classification Search
CPC .................................................. G06F 17/5009
USPC ........................................................... 703/13
See application file for complete search history.

(56) References Cited

U.S. PATENT DOCUMENTS

| | | | |
|---|---|---|---|
| 2005/0055453 A1* | 3/2005 | Zhu | G06F 17/30569 709/230 |
| 2008/0070495 A1* | 3/2008 | Stricklen | H04W 8/22 455/3.01 |
| 2008/0163262 A1* | 7/2008 | He | H04L 41/0681 719/321 |

* cited by examiner

*Primary Examiner* — Saif A Alhija

(57) ABSTRACT

An Open Mobile Alliance client mobile communication device simulator. A computer system comprising at least one processor and a memory, an application, when executed by the processor, sets up a configuration file for a simulated device, retrieves test conditions for device capabilities to be configured on the device from a data store, builds an expected test result file in an Open Mobile Alliance tree structure with tree node set up with device settings and leaf node with device setting values, sends a request to the Open Mobile Alliance Device Management server for initiating the device configuration, receives an extensible markup language payload from the Open Mobile Alliance Device Management server for a mobile communication device, processes contents of the extensible markup language payload, and builds a test file in the form of an Open Mobile Alliance tree structure wherein the contents of the test file resides in memory contiguously.

20 Claims, 4 Drawing Sheets

TESTING OPEN MOBILE ALLIANCE SERVER PAYLOAD ON AN OPEN MOBILE ALLIANCE CLIENT SIMULATOR

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Device management for a mobile communication device may consist of several functions where the mobile communication device is provisioned and/or configured for software updates or feature updates during or after first time use of the device. Device management may be performed over the air using the Open Mobile Alliance (OMA) Device Management protocol which is a standard in mobile communication device management that many original equipment manufacturers (OEM) and wireless carriers adopt. Wireless carriers conduct testing of mobile communication devices that may or may not yet be released into the market place by the original equipment manufacturers (OEM) and part of the testing includes the device management aspects for a device.

SUMMARY

In an embodiment, an Open Mobile Alliance client simulator is disclosed. It comprises a computer system comprising at least one processor and a memory, an application stored in the memory that, when executed by the processor, sets up a configuration file for a mobile communication device, retrieves test conditions and device capabilities to be configured on the device from a data store; builds an expected test result file in an Open Mobile Alliance tree structure with tree node set up with device settings and leaf node with device setting values. It then sends a request to the Open Mobile Alliance Device Management server for initiating the mobile communication device configuration and receives an extensible markup language payload from the Open Mobile Alliance Device Management server for a mobile communication device. It then processes contents of the extensible markup language payload and builds a test file in the form of an Open Mobile Alliance tree structure with tree node set with mobile communication device settings and leaf node with mobile communication device setting values wherein the contents of the test file resides in memory contiguously.

In another embodiment, a method of simulating an Open Mobile Alliance Client, comprising, setting up a configuration file for a mobile communication device, retrieving test conditions and device capabilities to be configured on the device from a data store, building an expected test result file in an Open Mobile Alliance tree structure with tree node set up with device settings and leaf node with device setting values, sending a request to the Open Mobile Alliance Device Management server for initiating the mobile communication device configuration, receiving an extensible markup language payload from the Open Mobile Alliance Device Management server for a mobile communication device and processing contents of the extensible markup language payload and building a test file in the form of an Open Mobile Alliance tree structure with tree node set with device settings and leaf node with device setting values wherein the contents of the test file resides in memory contiguously, comparing the contents of the test file with the expected test results file and determining the passing or failing of tests based on the comparison.

In another embodiment, a method of validating simulation results, comprising building an expected test result file in an Open Mobile Alliance tree structure with tree node set up with device settings and leaf node with device setting values, sending a request to the Open Mobile Alliance Device Management server for initiating the device configuration, receiving an extensible markup language payload from the Open Mobile Alliance Device Management server for a mobile communication device, processing contents of the extensible markup language payload and building a test file in the form of an Open Mobile Alliance tree structure with tree node set with mobile communication device settings and leaf node with mobile communication device setting values wherein the contents of the test file resides in memory contiguously, validating the contents of the test file against the expected test result file to ascertain if the test file contains the same tree nodes set with device settings as the expected test result file and the leaf node set with device setting values as the expected test result file, presenting results of passing or failure of test conditions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
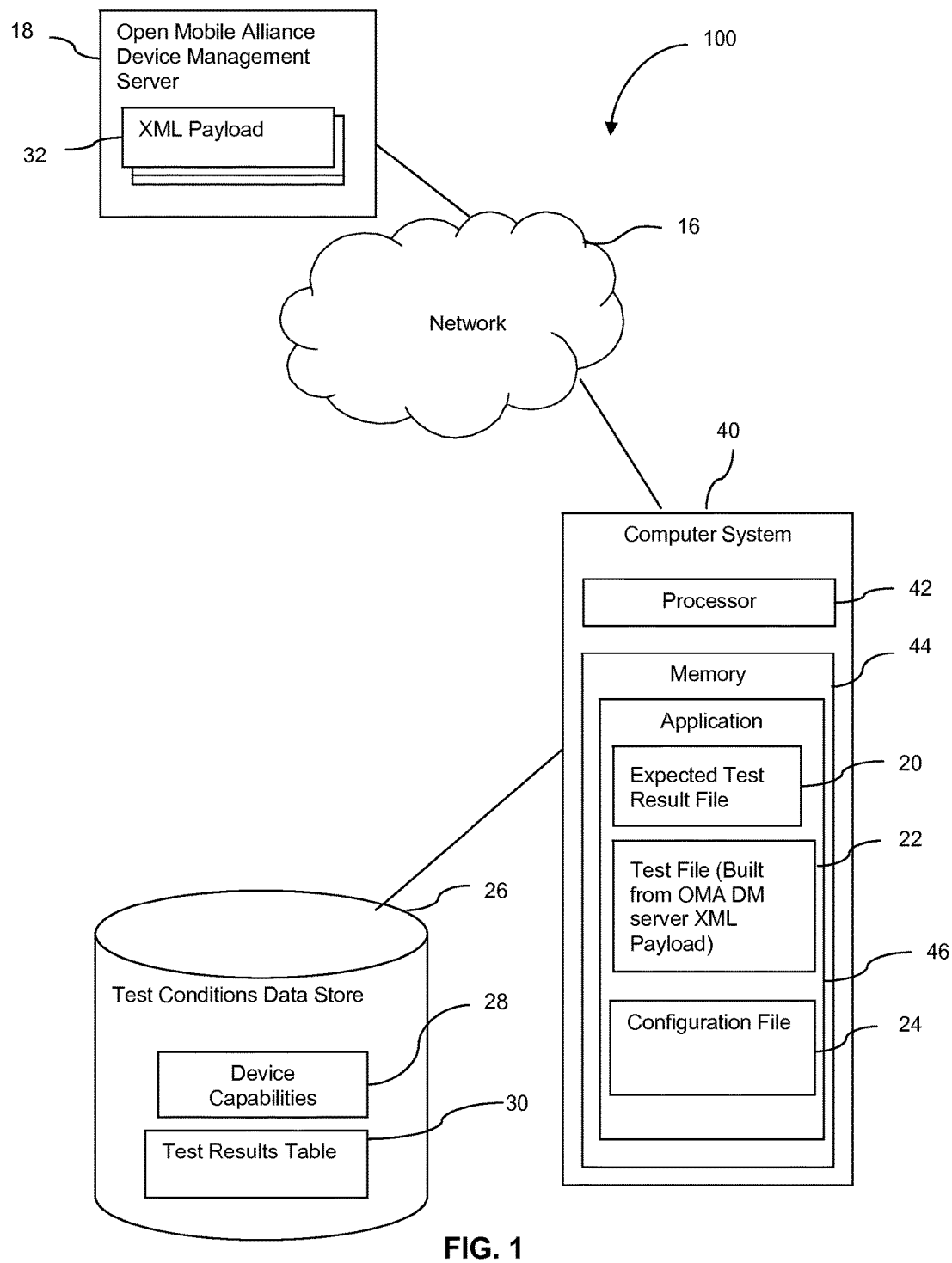
FIG. 1 is an illustration of a computer system according to an embodiment of disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When a new mobile communication device is released into the market place, a wireless carrier may conduct tests in order to verify proper functioning of the mobile communication device on the wireless carrier's server. A portion of the tests include testing the device management aspects of the mobile communication device. It is important that a wireless carrier's sever be versatile enough to manage mobile communication devices of differing hardware and software capabilities without causing a partial or system wide failure of the carrier's systems caused by the introduction of a new and unproven device to the carrier's wireless network. To prevent such a failure, wireless carriers often introduce new communication devices into a simulated server environment to test for any unforeseen consequences caused by the introduction of new and fully developed devices prior to the devices' release date. This allows the carrier to simulate the interaction between two known systems without risk of corruption to the wireless carrier's overall system. This technique follows a typical simulation routine in that the functionality between two or more known systems is tested to determine cross-compatibility between the two or more systems. For example, the systems being tested might be a known system A (e.g., the carrier's server) and a known system B (e.g., a fully developed communication device).

There are, however, circumstances where wireless carriers do not have access to a mobile communication device that is fully developed and the final hardware version of the device is not yet available for direct testing by the wireless carrier. Instead, the hardware manufacturer may provide the carrier with only basic operating parameters and capabilities of the mobile communication device. Because the wireless carrier may be facing a relatively short time frame between having access to the fully developed device and the mobile communication device's eventual release date it would be useful for the wireless carrier to have the capability of testing the currently known parameters of the communication device against the carrier's wireless server. The system being described herein differs from other techniques used in the industry in that it tests a first known system, the wireless carrier's server, against the effects of the introduction of an unknown system (i.e., a communication device which may still be under development).

This disclosure describes systems and methods focused towards testing the ability of the wireless carrier's server to effectively manage a wide array of devices. This mobile communication device management testing is enabled by the Open Mobile Alliance client on a mobile communication device interacting with an Open Mobile Alliance Device Management (OMA DM) server where the client on the device may initiate a request using the Open Mobile Alliance Device Management protocol to start the process of device management. Then the server initiates communication with the mobile communication device and issues commands by exchanging messages with the mobile communication device using an extensible markup language (XML) payload patterned on the Open Mobile Alliance tree structure. The Open Mobile Alliance tree structure is a hierarchical structure with interior tree nodes and leaf nodes of the tree where the nodes may associate to the device settings and the leaf nodes may contain a value of the device setting. The mobile communication device is configured when it processes the extensible markup language (XML) payload structured in accord with the form of the Open Mobile Alliance tree, responds to the commands issued by the Open Mobile Alliance Device Management server in the extensible markup language (XML) payload by setting the values for device settings in the appropriate location of the device. It is to be noted that the device setting on the mobile communication device is based on the values in the Open Mobile Alliance tree structure but the actual tree structure does not exist in a contiguous state in the memory of the device.

As stated above when mobile communication devices are not available in the market place or when they are released for testing just before launch of a device, testing the Open Mobile Alliance Device Management server becomes problematic in that the wireless carrier might not have access to the yet unreleased hardware to perform a complete server to device system test. In addition, testing various models of a mobile communication device from different original equipment manufacturers with different hardware and firmware and testing each of the client interaction codes with the Open Mobile Alliance Device Management server is expensive and time consuming. The present disclosure teaches building a simulator that simulates a mobile communication device and tests the Open Mobile Alliance Device Management server against the simulated mobile communication device. The simulator's functions are based on utilizing a database which contains the operating parameters of multiple physical devices and then evaluating the simulated mobile communication devices' interaction with the Open Mobile Alliance Device Management server thereby creating a common code that may simulate any model of the device manufactured by any original equipment manufacturer in any chosen configuration. This facilitates early development and testing of server side code and may bypass limitations in testing with a device that is not yet available.

A configuration file may be present on the simulator to describe or specify the device or a plurality of devices being simulated. The Open Mobile Alliance client code that is developed for the simulated mobile communication device may be made available on the simulator, and the simulator may also retrieve test data from a data store containing test conditions and device capabilities. The simulator may use the data store to publish test results. The simulator may then construct a file modeling the expected result of the Open Mobile Alliance Tree that configures the device for various device capabilities defined in the data store. The simulator may then make a request to the Open Mobile Alliance Device Management server to start the device management process. The Open Mobile Alliance Device Management server may respond by transmitting an extensible markup language (XML) payload. The simulator then processes the payload and may build a test file based on the Open Mobile Alliance Device Management tree structure. The simulator may then compare the expected result file with the test file built from the payload returned from the server. The validation of the test results is to ensure that the node setting in the expected result file is the same as the node setting in the test file that is built from the returned payload from the Open Mobile Alliance Device Management server.

For example, if a HTC X device is to be configured by an Open Mobile Alliance payload as a personal hotspot, the device mobile equipment identifier, encryption mechanism and model number for the HTC X may be written in the configuration file. In addition, the test conditions along with the mobile communication device capability, in this case, personal hotspot and the related parameters that need to be simulated for the personal hotspot on a HTC, may be available in the data store. The simulator then builds an expected test result file in the form of an Open Mobile Alliance tree with nodes that contain the device setting for a personal hotspot, for example, user id and a related leaf node containing the value of the user ID.

It should be noted that no Open Mobile Alliance tree is created on the actual, production mobile communication device during the course of an OMA DM update of the device. This expected test result file may be constructed until all the parameters for the personal hotspot are set as device settings and device setting values in appropriate nodes. This is stored in the simulator in internal memory or file memory. The simulator then initiates a connection with the Open Mobile Alliance Device Management server and appears to the server as an actual HTC device. The Open Mobile Alliance Device Management server then retrieves the extensible markup language (XML) payload corresponding to the connected HTC device and sends it to the simulator. The simulator then processes the payload and builds a test file with the payload in the form of an Open Mobile Alliance tree structure and stores the test file in the memory of the simulator. This test file may be stored in internal memory or file memory of the simulator. The simulator may then start the validation process where the expected test result file and the test file built from the payload are compared. If each mobile communication device setting for the capability of the personal hotspot is found to be matching between the two files, the simulator updates status of the test with the successful result of the test in the data store.

There may be several instances during the testing process where the test may not be successfully completed due to a failure to connect to the Open Mobile Alliance Device Management Server or for some other reason. As a result, the simulator may then update the status of a test or tests as "no run" and may provide an appropriate reason for the failure in a table in the data store where test results may be stored.

The simulator may be configured to test and evaluate multiple mobile communication devices from different manufacturers for example, Galaxy and iPhone, for the same device capability. These tests may be run in a single test run and the validation between the multiple test files and the expected test result files may be evaluated concurrently. The configuration of the simulator is flexible to test interactions of the Open Mobile Alliance Device Management server with multiple capabilities on multiple mobile communication devices and in multiple mobile communication device configurations. It is to be noted that the devices may be new to the market or they may also be legacy devices. In cases of legacy mobile communication devices, the same method may be employed to test existing functionality (i.e., regression testing) if there have been updates to the Open Mobile Alliance Device Management server code since the mobile communication device was last provisioned.

The Open Mobile Alliance client simulator may simulate a mobile communication device comprising a mobile equipment identifier, model number and encryption mechanism singly or may be configured to read from a database containing a device list thereby running multiple tests simultaneously. The simulator may be scaled to handle multiple concurrent sessions with the Open Mobile Alliance Device Management server and the simulator code may coexist with the Open Mobile Alliance Device Management server code or may reside on a local network, wireless network, or other network. This portable code facilitates remote testing and testing on different network elements. The performance of the network (e.g., load testing) may be tested with these different configurations.

The simulator may be configured to handle differences in how each mobile communication device may interact with the Open Mobile Alliance Device Management server where a session with the Open Mobile Alliance Device Management server could be open for the length of the interaction with the server or when the session is opened and closed each time a capability is established on the device. For example, the simulated mobile communication device may initiate a first session with the Open Mobile Alliance Device Management server and exchange a first message and a second message and a third message with the Open Mobile Alliance Device Management server via the first session. After communication is complete, the first session may be ended. Alternately, the simulated mobile communication device may initiate a first session with the Open Mobile Alliance Device Management server, exchange a first message with the Open Mobile Alliance Device Management server, and end the first session. The simulated mobile communication device may then open a second session, exchange a second message with the Open Mobile Alliance Device Management server, and end the second session. The simulated mobile communication device may then open the third session with the Open Mobile Alliance Device Management server, exchange a third message with the Open Mobile Alliance Device Management server, and end the third session.

The simulator may also be used for load testing by invoking tests to the Open Mobile Alliance Device Management server which would simulate thousands of concurrent sessions or threads from the simulated mobile communication device to the server. This may depend on the scalability of architecture of the simulator. This may emulate a high load in the production environment where there may be hundreds of thousands of users who receive a firmware release to a mobile communication device that they may possess. Load testing for these conditions may be performed by configuring the simulator for many thousands of devices and testing the interaction of the Open Mobile Alliance Device management server.

The testing that may be accomplished with the simulator can span unit, integration, load and performance testing which may facilitate earlier release schedules of the device certification thereby saving the time and expense of testing new hardware or firmware against devices on an ad hoc basis. Overall automation of testing is also feasible with the simulator.

Turning now to FIG. 1 a system 100 is disclosed. In an embodiment, the system 100 comprises a computer system 40 connected to a network 16, an Open Alliance Device Management server (OMA DM) 18 comprising a plurality of XML Payloads 32, and a test conditions data store 26. The computer system 40 comprises a processor 42, a memory 44 and an application 46 within the memory 44 of the computer system 40.

The application 46 comprises a configuration file 24, an expected test result file 20 and a test file 22 which is processed and built by the application 46 after reading a XML Payload 32. Said in other words, the test file 22 may exist transiently in the memory 44 and/or in the application 46, for example after it has been built during the execution of a test of the functionality of the Open Mobile Alliance Device Management server 18 and before it is deleted from the memory, in other words, after the pass/fail result of the test is determined. The application 46 interacts with the test conditions data store 26 which has the test conditions, device capabilities 28 and where test results are published in test results table 30. In an embodiment, the application 46 simulates the Open Mobile Alliance client of a mobile communication device and tests the interaction with the Open Mobile Alliance Device Management server 18 for new mobile communication devices that are not yet available to the wireless carriers for testing.

The application 46 reads from the configuration file 24, the new device parameters such as model number, mobile equipment identifier and the encryption mechanism that the device uses. These mobile communication device parameters may be obtained from an outside source (i.e., the specification associated with the device) and may be manually, or otherwise, inputted into the configuration file. The application 46 then retrieves the device capabilities 28 that are expected to be set by the interaction with the Open Mobile Alliance Device Management server 18 from the test conditions data store 26. The application 46 builds an expected test result file 20 in the form of an Open Mobile Alliance Device Management tree with a node set with device settings and the leaf node set with any device setting value(s) that the device capabilities 28 may require. When the application 46 retrieves the mobile communication device capabilities 28 from the test conditions data store 26, the end result is that there is at least one expected test result file 20 that is built and stored in the memory 44 of the computer system 40. This may be stored in file memory or internal memory. There may be at least one test condition to run the application 46 based on which there may be one expected test result file 20 constructed by the application 46. In addition, there may be at least one expected test result file 20 built for every different model of device in the configuration file 24.

The application 46 then initiates connection with the Open Mobile Alliance Device Management server 18 and if the connection fails writes to the Test Results table 30 in the test conditions data store 26, a 'no run' status and the reason for the failed attempt. This may be further analyzed and a fix for the root cause of the problem may be explored. When the connection from the application 46 to the Open Mobile Alliance Device Management server 18 is successful, the server sends an XML payload 32 containing the instructions for configuring the device that is being simulated. There may be at least one XML Payload 32 for each mobile communication device in the configuration file. The XML Payload 32 is then processed by the application 46 where the application 46 parses the payload to build a test file 22 according to the model of an Open Mobile Alliance tree structure. The application 46 may build the test file 22 where the device settings are in the tree node of the Open Mobile Alliance tree and the values of the device settings are in the leaf node of the Open Mobile Alliance tree structure. The test file 22 is built in the memory 44 of the computer system 40 and is available contiguously in the memory 44. Said in other words, the test file 22 provides values of the OMA tree for the OMA DM operation commanded by the XML Payload 32, and these values are stored in memory contiguously, unlike the corresponding values which might be stored in an actual mobile communication device responsive to an OMA DM operation. In the case of an actual mobile communication device, at least some of the values would be stored at separate storage locations within the mobile communication device and not all contiguously. It is understood that the test file 22 may exist in internal memory or file memory. After successful processing of the XML Payload 32, there must be at least one expected test result file 20 that is stored in the memory of the application 46.

The test file 22 may be built in the form of an Open Mobile Alliance tree structure with nodes and leaf nodes where the tree nodes may have the device settings and the leaf nodes may have the corresponding device setting values for configuring the mobile communication device that is being simulated. The application 46 then validates the test file 22 against the expected test result file 20 and compares the device setting on the node device setting values on the leaf node between the two files. This may be validated for each device capability that is to be enabled and configured on the computer system 40. If there is a match between the two files for a mobile communication device capability, the application 46 may write a 'pass' (or other indication of a successful test) in the test results table 30 in the test conditions data store 26. If there is no match between the two files for a device mobile communication capability, the application 46 may write a 'fail' (or other indication of an unsuccessful test) in the test results table 30 in the test conditions data store 26.

In another embodiment, there may be multiple mobile communication devices which may be configured simultaneously in the configuration file 24 by the application 46. The application 46 may execute one simulated mobile communication device at a time or execute all of the mobile communication devices concurrently. Multiple expected test result files 20 may be built for each different model or configuration of the simulated device. The XML payload 32 from the Open Mobile Alliance Device Management server 18 may be processed for each simulated mobile communication device and the test file 22 may be built for each simulated mobile communication device. The application 46 may run the validation of the corresponding set of expected test result file 20 against the test file 22 and may update the test results table 30 for each simulated mobile communication device.

The application 46 may exist on a computer system 40. The computer system 40 may be coupled to the network 16 by a wired link or by a wireless link or may be ported on a local network or an enterprise network as needed. Performance of the network connectivity between the application 46 and the Open Mobile Alliance Device Management server 18 may be tested with multiple configurations of the application 46. As stated above the system being tested is the Open Mobile Alliance Device Management server 18. In addition, application 46 may be made scalable where the Open Mobile Alliance Device Management server 18 may be accessed in up to a thousand sessions, or some other number of sessions, thereby conducting load testing of the device and the server. The application 46 may also be configured for a legacy device and existing functionality may be tested with changes in the Open Mobile Alliance Device Management server if any. This assists with regression testing of Open Mobile Alliance server capabilities. With the test conditions data store, it is also possible to automate tests thereby allowing up to date data on a wide range of device and server behavior under different conditions. A successful simulation result is defined as a match between the expected test result file 20 and the test file 22.

Figure 2:
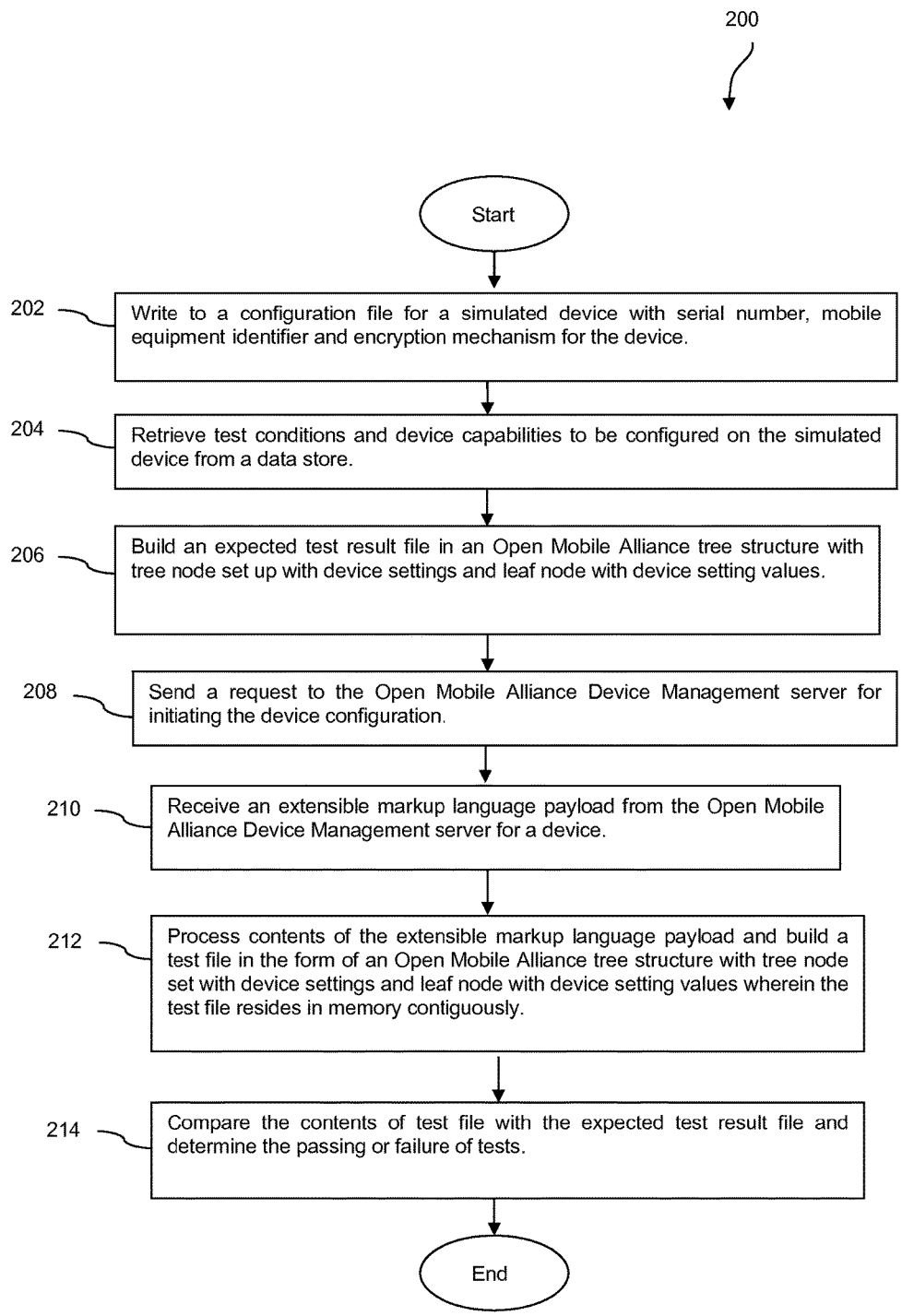
FIG. 2 is a flow chart illustrating a method according to an embodiment of the disclosure.

Turning now to FIG. 2, a method 200 is described. At block 202, write to a configuration file for a simulated device with serial number, mobile equipment identifier and encryption mechanism for the device. At block 204, retrieve test conditions for mobile communication device capabilities to be configured on the simulated mobile communication device from a data store. At block 206, build an expected test result file in an Open Mobile Alliance tree structure with tree node set up with mobile communication device settings and leaf node with device setting values. At block 208, send a request to the Open Mobile Alliance Device Management server for initiating the device configuration. At block 210, receive an extensible markup language payload from the Open Mobile Alliance Device Management server for a mobile communication device. At block 212, process contents of the extensible markup language payload and build a test file in the form of an Open Mobile Alliance tree structure with tree node set with device settings and leaf node with device setting values wherein the test file resides in memory contiguously. At block 214, compare the contents of the test file with the expected test result file and determine the passing or failing of tests.

Figure 3:
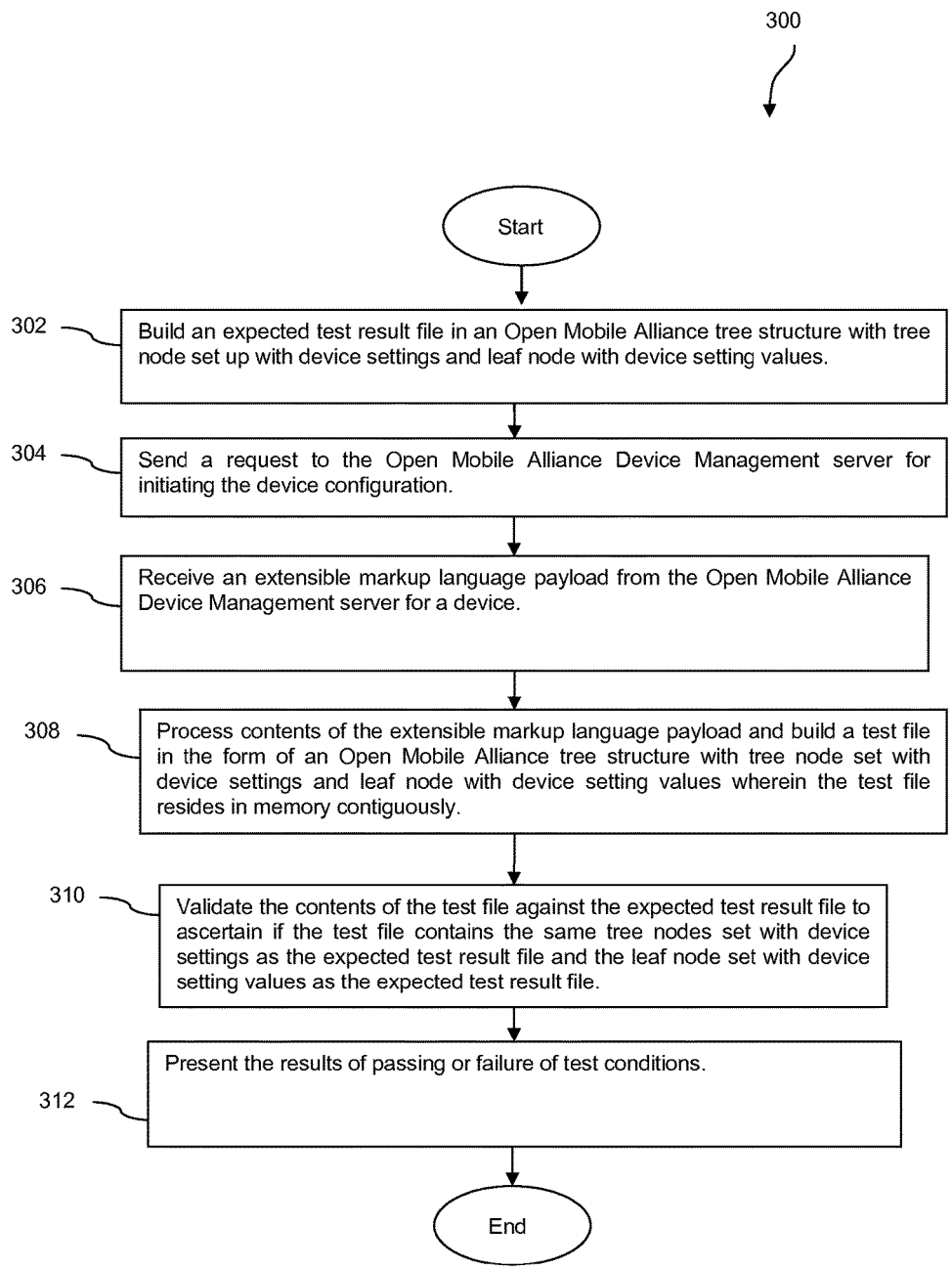
FIG. 3 is a flow chart illustrating another method according to an embodiment of the disclosure.

Turning now to FIG. 3, a method 300 is described. At block 302, build an expected test result file in an Open Mobile Alliance tree structure with tree node set up with mobile communication device settings and leaf node with device setting values. At block 304, send a request to the Open Mobile Alliance Device Management server for initiating the mobile communication device configuration. At block 306, receive an extensible markup language payload from the Open Mobile Alliance Device Management server for a mobile communication device. At block 308, process contents of the extensible markup language payload and build a test file in the form of an Open Mobile Alliance tree structure with tree node set with mobile communication device settings and leaf node with mobile communication device setting values wherein the test file resides in memory contiguously. At block 310, validate the contents of the test file against the expected test result file to ascertain if the test file contains the same tree nodes set with device settings as the expected test result file and the leaf node set with device setting values as the expected test result file. At bock 312, present results of passing or failure of test conditions.

Figure 4:
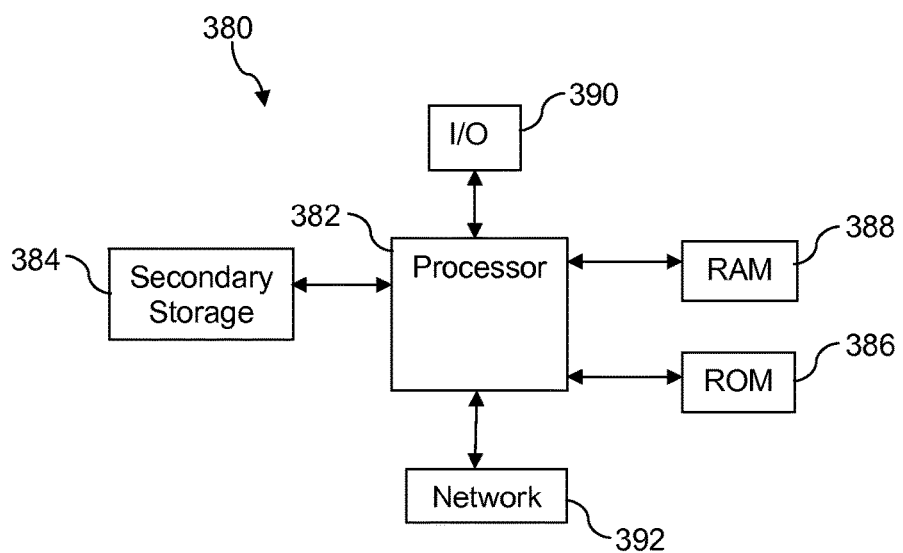
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors; liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of simulating an Open Mobile Alliance Client, each step of the method performed by an application stored in a non-transitory memory of a computer system and executable by a processor of the computer system, the method comprising:

writing to a configuration file for a simulated device with serial number, mobile equipment identifier and encryption mechanism for the simulated device, wherein the simulated device simulates a mobile communication device that is under development and not yet available to a wireless carrier for testing based on operating parameters of the mobile communication device;

retrieving test conditions and device capabilities to be configured on the simulated device from a data store;

building, based on the device capabilities from the data store, an expected test result file in an Open Mobile Alliance tree structure with tree node set up with device settings for the simulated device and leaf node with device setting values for the simulated device;

sending a request to an Open Mobile Alliance Device Management server for initiating device configuration for the simulated device;

receiving an extensible markup language (XML) payload from the Open Mobile Alliance Device Management server for the simulated device;

processing contents of the XML payload and building a test file in the form of an Open Mobile Alliance tree structure with tree node set with device settings and leaf node with device setting values based on the processing of the contents of the XML payload, wherein the contents of the test file resides in memory contiguously; and comparing the contents of the test file with the expected test result file and determining pass or fail of tests for the simulated device based on the comparison, wherein responsive to the comparison, the mobile communication device is configured using the Open Mobile Alliance Device Management server.

2. The method of claim 1, wherein the configuration file is set up for a plurality of simulated devices at the same time.

3. The method of claim 1, wherein there is at least one test condition in the data store for building an expected test result file.

4. The method of claim 1, wherein one expected test result file is built for every simulated device that is in the configuration file.

5. The method of claim 1, wherein the expected test result file is stored in file memory or internal memory of the computer system.

6. The method of claim 1, wherein there may be multiple concurrent requests sent to the Open Mobile Alliance Device Management server for a plurality of simulated devices.

7. The method of claim 1, further comprising updating the test conditions in the data store with a no run status if connection with the Open Mobile Alliance Device Management server cannot be established.

8. The method of claim 1, wherein there is at least one test file in the form of an Open Mobile Alliance tree structure after an XML payload is received and processed from the Open Mobile Alliance Device Management server.

9. The method of claim 1, wherein there is at least one XML payload received from the server for each device in the configuration file.

10. A method of validating simulation results, each step of the method performed by an application stored in a non-transitory memory of a computer system and executable by a processor of the computer system, the method comprising:

building an expected test result file in an Open Mobile Alliance tree structure with tree node set up with device settings for a simulated device and leaf node with setting values for the simulated device, wherein the simulated device simulates a mobile communication device that is under development and not yet available to a wireless carrier for testing based on operating parameters of the mobile communication device;

sending a request to an Open Mobile Alliance Device Management server for initiating device configuration of the simulated device;

receiving an extensible markup language (XML) payload from the Open Mobile Alliance Device Management server for the simulated device;

processing contents of the XML payload and building, by the application, a test file in the form of an Open Mobile Alliance tree structure with tree node set with device settings and leaf node with device setting values based on the processing of the contents of the XML payload, wherein the contents of the test file resides in memory contiguously, validating the contents of the test file against the expected test result file to ascertain if the test file contains the same tree nodes set with device settings as the expected test result file and the leaf node set with device setting values as the expected test result file; and presenting results of passing or failure of test conditions for the simulated device based on the validation, wherein responsive to the validation, the mobile communication device is configured using the Open Mobile Alliance Device Management server.

11. The method of claim 10, wherein the test conditions is a no run status when connection to the Open Mobile Alliance Device Management server cannot be established.

12. The method of claim 10, wherein the test condition passes if the device setting and the device setting values match in the appropriate tree node and leaf node respectively between the test file and expected result test file.

13. The method of claim 10, wherein the test condition fails if the device setting and the device setting values do not match in the appropriate tree node and leaf node respectively between the test file and expected result test file.

14. An Open Mobile Alliance client simulator comprising:
a computer system comprising at least one processor and a memory; and
an application stored in the memory that, when executed by the processor,
writes to a configuration file for a simulated device with model number, mobile equipment identifier, and encryption mechanism of the simulated device, wherein the simulated device simulates a mobile communication device that is under development and not yet available to a wireless carrier for testing based on operating parameters of the mobile communication device;
retrieves test conditions and device capabilities to be configured on the simulated device from a data store;
builds, based on the device capabilities from the data store, an expected test result file in an Open Mobile Alliance tree structure with tree node set up with device settings for the simulated device and leaf node with device setting values for the simulated device;
sends a request to an Open Mobile Alliance Device Management server for initiating device configuration for the simulated device;
receives an extensible markup language (XML) payload from the Open Mobile Alliance Device Management server for the simulated device;
processes contents of the XML payload and builds a test file in the form of an Open Mobile Alliance tree structure with tree node set with device settings and leaf node with device setting values based on the processing of the contents of the XML payload, wherein the contents of the test file resides in memory contiguously; and
compares the contents of the test file with the expected test result file, wherein responsive to the comparison, the mobile communication device is configured using the Open Mobile Alliance Device Management server.

15. The system of claim 14, wherein the configuration file is setup for a plurality of devices at the same time.

16. The system of claim 14, wherein there is at least one expected test result file every time the application is executed.

17. The system of claim 14, wherein the application updates a status of no run in the data store where the test conditions are stored when contact with the Open Mobile Alliance Device Management server cannot be established.

18. The system of claim 14, wherein the application initiates multiple concurrent sessions with the Open Mobile Alliance Device Management server and in return receives multiple test files with an appropriate XML payload for each session.

19. The system of claim 14, wherein the application receives at least one XML payload for a successful request to the Open Mobile Alliance Device Management server.

20. The system of claim 14, wherein the application stores the contents of the test file contiguously in internal memory or file memory of the computer system.

* * * * *